United States Patent
Yeh

(10) Patent No.: US 8,812,784 B2
(45) Date of Patent: Aug. 19, 2014

(54) COMMAND EXECUTING METHOD, MEMORY CONTROLLER AND MEMORY STORAGE APPARATUS

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 550 days.

(21) Appl. No.: 13/244,676

(22) Filed: Sep. 25, 2011

(65) Prior Publication Data

US 2013/0013853 A1  Jan. 10, 2013

(30) Foreign Application Priority Data

Jul. 6, 2011  (TW) .............................. 100123884 A

(51) Int. Cl.
*G06F 13/00*  (2006.01)
*G06F 12/02*  (2006.01)

(52) U.S. Cl.
CPC .... *G06F 12/0246* (2013.01); *G06F 2212/7203* (2013.01)
USPC .................................. 711/118; 711/E12.052

(58) Field of Classification Search
CPC ...................................................... G06F 12/02
See application file for complete search history.

(56) References Cited

U.S. PATENT DOCUMENTS

| | | | | |
|---|---|---|---|---|
| 7,936,814 B2 * | 5/2011 | Greenfield et al. | ...... | 375/240.01 |
| 2008/0320255 A1 * | 12/2008 | Wingard et al. | .............. | 711/157 |
| 2009/0265293 A1 * | 10/2009 | Nicholas et al. | ................ | 706/45 |
| 2009/0287876 A1 * | 11/2009 | Yeh | .............................. | 711/103 |
| 2010/0293321 A1 * | 11/2010 | Weingarten | .................... | 711/103 |
| 2012/0311246 A1 * | 12/2012 | McWilliams et al. | ......... | 711/103 |
| 2014/0019675 A1 * | 1/2014 | Oh et al. | ........................ | 711/103 |

\* cited by examiner

*Primary Examiner* — Sean D Rossiter
(74) *Attorney, Agent, or Firm* — Jianq Chyun IP Office

(57) ABSTRACT

A command executing method for a memory storage apparatus and a memory controller and the memory storage apparatus using the same are provided. The method includes, during a data merging operation, receiving a write command and a write data corresponding to the write command from a host system. The method also includes temporarily storing the write data into a buffer memory, and at a delay time point, transmitting a response message to the host, the delay time point is set by adding a dummy delay time to a time point that the operation of writing the write data into the buffer memory is completed. Accordingly, the method can effectively level the response times of executing write commands during the data merging operation, thereby shortening the maximum access time.

25 Claims, 12 Drawing Sheets

COMMAND EXECUTING METHOD, MEMORY CONTROLLER AND MEMORY STORAGE APPARATUS

CROSS-REFERENCE TO RELATED APPLICATION

This application claims the priority benefit of Taiwan application serial no. 100123884, filed Jul. 6, 2011. The entirety of the above-mentioned patent application is hereby incorporated by reference herein and made a part of this specification.

BACKGROUND

1. Technology Field

The present invention relates to a command executing method. Particularly, the present invention relates to a command executing method of executing a plurality of write commands received from a host system, a memory controller and the memory storage apparatus using the same.

2. Description of Related Art

Digital cameras, cell phones, and MP3 players have undergone rapid growth in recent years, so that consumer demands for storage media have also rapidly increased. A rewritable non-volatile memory is one of the most adaptable memories for electronic products (for example, notebook computers) due to its characteristics such as data non-volatility, low power consumption, small volume, non-mechanical structure, and high read-and-write speed. A solid state drive (SSD) is a storage apparatus which uses a flash memory as its storage medium. Thus, in recent years, the flash memory industry has become a major part of the electronic industry.

The rewritable non-volatile memory has a plurality of physical blocks, and each physical block has a plurality of physical pages, where when data is written into the physical block, it has to be sequentially written according to a sequence of the physical pages. Moreover, the physical pages written with data have to be erased first for again writing data thereon. Particularly, the physical block is the smallest unit that can be erased, and the physical page is the smallest unit that can be programmed. Therefore, in management of the rewritable non-volatile memory, the physical blocks are at least grouped into a data area and a spare area.

The physical blocks of the data area (which are also referred to as data physical blocks) have used for storing data stored by a host system. In detail, a memory management circuit converts a logical access address accessed by the host system into a logical page of a logical block, and maps the logical page of the logical block to a physical page of a physical block of the data area. Namely, in management of the rewritable non-volatile memory module, the physical blocks of the data area are regarded as used physical blocks (for example, stored with data written by the host system). For example, the memory management circuit may use a logical block-physical block mapping table to record a mapping relationship between the logical blocks and the physical blocks of the data area, wherein the logical pages of the logical block sequentially correspond to the physical pages of the mapped physical block.

The physical blocks of the spare area are used to substitute the physical blocks of the data area. In detail, as described above, the physical block written with data has to be erased first for again writing data thereon, so that the physical blocks of the spare area are designed to be written with updated data to substitute the physical blocks originally mapped to the logical blocks. Therefore, the physical blocks in the spare area are empty or available physical blocks, i.e. physical blocks that are not stored with data or physical blocks stored with data marked to be invalid.

Namely, the physical pages of the physical blocks of the data area and the spare area are used to map the logical pages of the logical blocks in an alternating manner, so as to store the data written by the host system.

For example, when the logical access address to be written with updated data by the host system corresponds to a certain logical page of a certain logical block of the storage apparatus, the memory management circuit of the storage apparatus selects one physical block from the spare area, and writes the updated data into physical pages of the selected physical block. Then, when the physical blocks of the spare area are exhausted, the memory management circuit performs a data merging operation to the logical block. For example, in the data merging operation, the memory management circuit selects a physical block from the spare area to serve as a new data physical block, and writes all updated and valid data belonging to the logical block into the new data physical block, and re-maps the logical block to the new data physical block.

To effectively improve the accessing performance, the memory storage apparatus is generally configured with a buffer memory. For example, when a write command and data to be written are received from the host system, the memory management circuit temporarily stores the data to be written and related information (for example, the logical page where the write data belongs to) into the buffer memory, and sends a response message to the host system to notify that the write command is completed, so as to shorten a response time. Then, when the buffer memory is full, the data in the buffer memory is written into the rewritable non-volatile memory module, so as to empty the storage space of the buffer memory to store a next batch of write data.

However, in case that the buffer memory is full and the physical blocks of the spare area are to be exhausted, if the write command is received from the host system, the memory management circuit has to complete the data merging operation in order to execute the write command. Since the data merging operation is time-consuming, compared to executions of other access commands, the host system has to wait a rather long time to receive the response message notifying that the write command is completed from the memory storage apparatus. During such process, a user of the host system may mistake that the memory storage apparatus is down or perceive that the memory storage apparatus is unstable. Therefore, in case that the buffer memory is written full and the physical blocks of the spare area are to be exhausted, how to shorten the time for the host system receiving the response message is an important issue.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a command executing method, a memory controller and a memory storage apparatus using the same, which can effectively level times for simultaneously executing a plurality of write commands during a data merging operation.

An exemplary embodiment of the present invention provides a command executing method for a memory storage apparatus having a buffer memory and a rewritable non-volatile memory module, wherein the rewritable non-volatile memory module has a plurality of physical blocks, and the physical blocks are logically grouped into at least a data area and a spare area, and the physical blocks of the data area are mapped to a plurality of logical blocks. The command executing method includes executing a data merging operation to a first logical block in the logical blocks, wherein during the data merging operation, valid data belonged to the first logical block is copied to a first physical block selected from the physical blocks of the spare area, wherein the first physical block has a plurality of physical pages. The command executing method also includes receiving a write command and data (hereinafter referred to as "write data") corresponding to the write command from a host system during a period of executing the data merging operation. The method also includes determining whether the number of the physical pages written with data in the physical pages of the first physical block is greater than a predetermined physical page number. The method also includes when the number of the physical pages written with data in the physical pages of the first physical block is not greater than the predetermined physical page number, temporarily storing the write data into the buffer memory and transmitting a response message to the host system at a delay time point, wherein the delay time point is set by adding a dummy delay time to a time point that the operation of writing the write data into the buffer memory is completed, and the response message is used for notifying that the write command is completed.

An exemplary embodiment of the present invention provides a memory controller for controlling a rewritable non-volatile memory module. The memory controller includes a host interface, a memory interface, a memory management circuit and a buffer memory. The host interface is configured for coupling to a host system. The memory interface is configured for coupling to the rewritable non-volatile memory module, wherein the rewritable non-volatile memory module has a plurality of physical blocks. The memory management circuit is coupled to the host interface and the memory interface. The buffer memory is coupled to the memory management circuit. The memory management circuit is configured for logically grouping the physical blocks into at least a data area and a spare area, and configuring a plurality of logical blocks for mapping to the physical blocks of the data area. Moreover, the memory management circuit performs a data merging operation to a first logical block in the logical blocks, wherein during the data merging operation, valid data belonging to the first logical block is copied to a first physical block selected from the physical blocks of the spare area, wherein the first physical block has a plurality of physical pages. Moreover, the memory management circuit receives a write command and data (hereinafter referred to as "write data") corresponding to the write command from the host system during a period of executing the data merging operation. In addition, the memory management circuit determines whether the number of the physical pages written with data in the physical pages of the first physical block is greater than a predetermined physical page number. When the number of the physical pages written with data in the physical pages of the first physical block is not greater than the predetermined physical page number, the memory management circuit temporarily stores the write data into the buffer memory and transmits a response message to the host system at a delay time point, wherein the delay time point is set by adding a dummy delay time to a time point that the operation of writing the write data into the buffer memory is completed, and the response message is used for notifying that the write command is completed.

An exemplary embodiment of the present invention provides a memory storage apparatus including a connector, a rewritable non-volatile memory module and a memory controller. The connector is configured for coupling to a host system. The rewritable non-volatile memory module has a plurality of physical blocks. The memory controller is coupled to the rewritable non-volatile memory module and the connector. The memory controller is configured for logically grouping the physical blocks into at least a data area and a spare area, and configuring a plurality of logical blocks for mapping to the physical blocks of the data area. Moreover, the memory controller performs a data merging operation to a first logical block in the logical blocks, wherein during the data merging operation, valid data belonged to the first logical block is copied to a first physical block selected from the physical blocks of the spare area, wherein the first physical block has a plurality of physical pages. Moreover, the memory controller receives a write command and data (hereinafter referred to as "write data") corresponding to the write command from the host system during a period of executing the data merging operation. In addition, the memory controller determines whether the number of the physical pages written with data in the physical pages of the first physical block is greater than a predetermined physical page number. When the number of the physical pages written with data in the physical pages of the first physical block is not greater than the predetermined physical page number, the memory controller temporarily stores the write data into the buffer memory and transmits a response message to the host system at a delay time point, wherein the delay time point is set by adding a dummy delay time to a time point that the operation of writing the write data into the buffer memory is completed, and the response message is used for notifying that the write command is completed.

An exemplary embodiment of the present invention provides a command executing method for a memory storage apparatus having a buffer memory and a rewritable non-volatile memory module, wherein the rewritable non-volatile memory module has a plurality of physical blocks, and the physical blocks are logically grouped into at least a data area and a spare area, and the physical blocks of the data area are mapped to a plurality of logical blocks. The command executing method includes executing a data merging operation to a first logical block in the logical blocks, wherein during the data merging operation, valid data belonging to the first logical block is copied to a first physical block selected from the physical blocks of the spare area. The command executing method also includes receiving a first write command and a first write data corresponding to the first write command from a host system and temporarily storing the first write data into the buffer memory during a period of executing the data merging operation. The method also includes transmitting a first response message to the host system at a first time point, wherein the first time point is set by adding a first dummy delay time to a time point that the operation of writing the first write data into the buffer memory is completed, and the first response message is used for notifying that the first write command is completed.

An exemplary embodiment of the present invention provides a memory controller for controlling a rewritable non-volatile memory module. The memory controller includes a host interface, a memory interface, a memory management circuit and a buffer memory. The host interface is configured for coupling to a host system. The memory interface is configured for coupling to the rewritable non-volatile memory module, wherein the rewritable non-volatile memory module has a plurality of physical blocks. The memory management circuit is coupled to the host interface and the memory interface. The buffer memory is coupled to the memory management circuit. The memory management circuit is configured for logically grouping the physical blocks into at least a data area and a spare area, and configuring a plurality of logical blocks for mapping to the physical blocks of the data area. Moreover, the memory management circuit performs a data merging operation to a first logical block in the logical blocks, wherein during the data merging operation, valid data belonging to the first logical block is copied to a first physical block selected from the physical blocks of the spare area. Moreover, the memory management circuit receives a first write command and a first write data corresponding to the first write command from the host system and temporarily stores the first write data into the buffer memory during a period of executing the data merging operation. Moreover, the memory management circuit transmits a first response message to the host system at a first time point, wherein the first time point is set by adding a first dummy delay time to a time point that the operation of writing the first write data into the buffer memory is completed, and the first response message is used for notifying that the first write command is completed.

An exemplary embodiment of the invention provides a memory storage apparatus including a connector, a rewritable non-volatile memory module and a memory controller. The connector is configured for coupling to a host system. The rewritable non-volatile memory module has a plurality of physical blocks. The memory controller is coupled to the rewritable non-volatile memory module and the connector. The memory controller is configured for logically grouping the physical blocks into at least a data area and a spare area, and configuring a plurality of logical blocks for mapping to the physical blocks of the data area. Moreover, the memory controller performs a data merging operation to a first logical block in the logical blocks, wherein during the data merging operation, valid data belonging to the first logical block is copied to a first physical block selected from the physical blocks of the spare area. Moreover, the memory controller receives a first write command and a first write data corresponding to the first write command from the host system and temporarily stores the first write data into the buffer memory during a period of executing the data merging operation. Moreover, the memory controller transmits a first response message to the host system at a first time point, wherein the first time point is set by adding a first dummy delay time to a time point that the operation of writing the first write data into the buffer memory is completed, and the first response message is used for notifying that the first write command is completed.

According to the above descriptions, the response times of the write commands executed during the data merging operation are leveled, so as to shorten a maximum access time, and accessing of the memory storage apparatus can be more fluent.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF DISCLOSED EMBODIMENTS

Figure 1A:
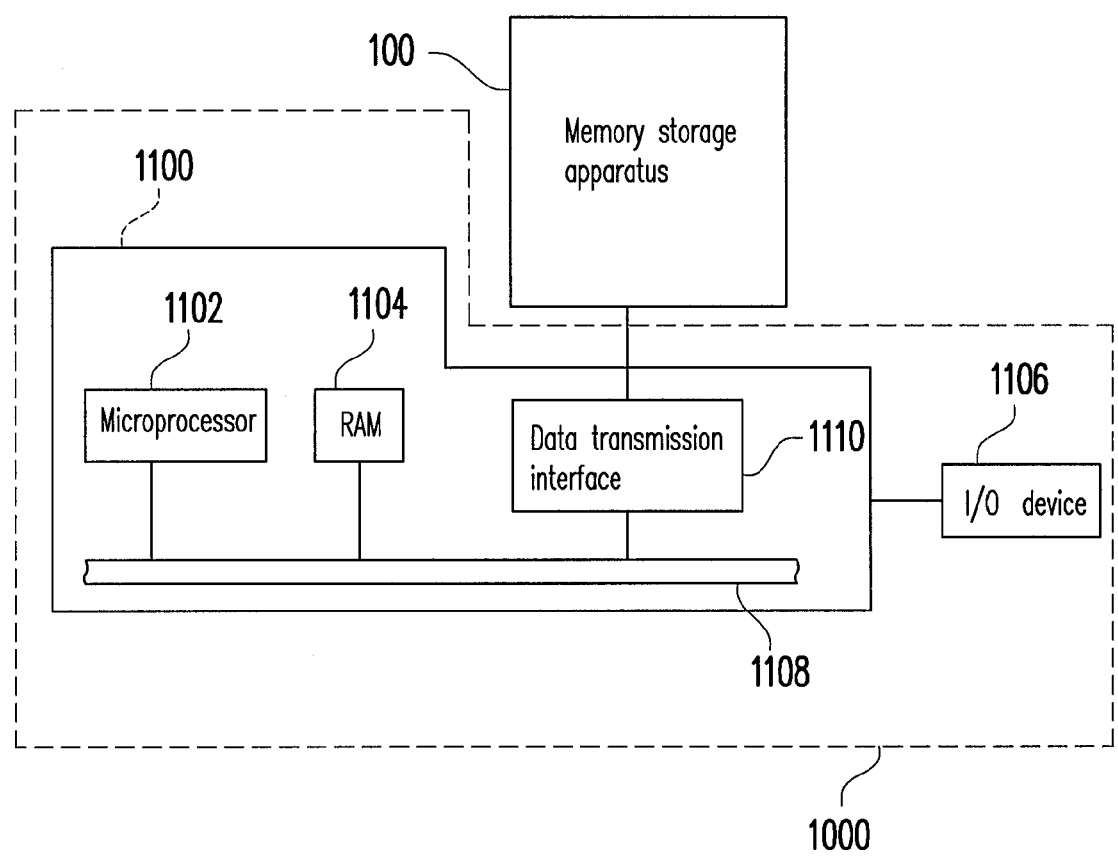
FIG. 1A is a diagram illustrating a host system and a memory storage apparatus according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage apparatus (which is also referred to as a memory storage system) includes a rewritable non-volatile memory module and a controller (which is also referred to as a control circuit). The memory storage apparatus is generally used together with a host system, so that the host system can write data into the memory storage apparatus or read data from the memory storage apparatus.

FIG. 1A is a diagram illustrating a host system and a memory storage apparatus according to an exemplary embodiment of the present invention.

Figure 1B:
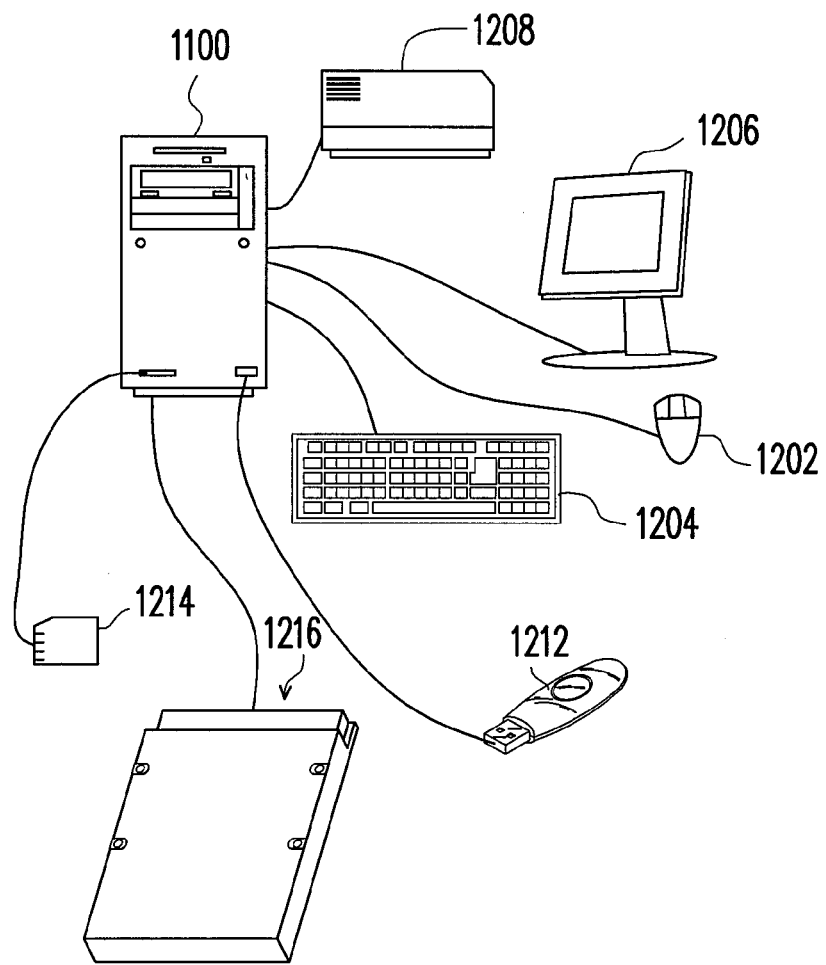
FIG. 1B is a schematic diagram illustrating a computer, input/output devices and memory storage apparatus according to an exemplary embodiment of the present invention.

Referring to FIG. 1A, the host system 1000 generally includes a computer 1100 and an input/output (I/O) device 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206 and a printer 1208 shown in FIG. 1B. It should be noticed that the devices shown in FIG. 1B are not used to limit to the I/O device 1106, and the I/O device 1106 may also include other devices.

In the present embodiment, the memory storage apparatus 100 is coupled to the other devices of the host system 1000 through the data transmission interface 1110. Based on operations of the microprocessor 1102, the RAM 1104, and the I/O device 1106, data can be written into the memory storage apparatus 100 or read from the memory storage apparatus 100. For example, the memory storage apparatus 100 can be a rewritable non-volatile memory storage device such as a flash drive 1212, a memory card 1214 or a solid state drive (SSD) 1216 shown in FIG. 1B.

Figure 1C:
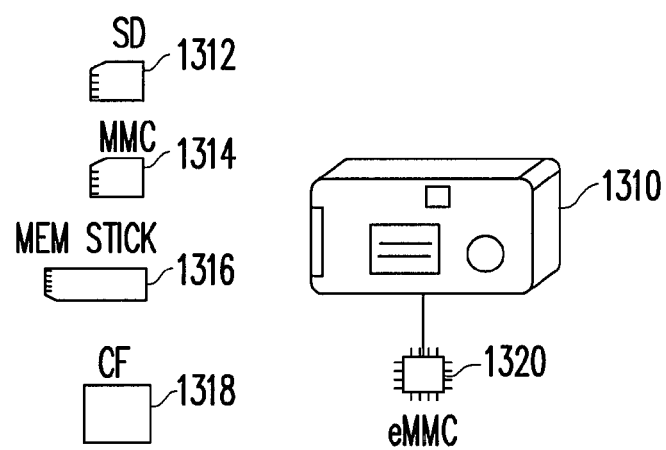
FIG. 1C is a schematic diagram illustrating a host system and memory storage apparatus according to another exemplary embodiments of the present invention.

Generally, the host system 1000 can be any system substantially used together with the memory storage apparatus 100 for storing data. In the present exemplary embodiment, although the host system 1000 implemented by a computer system is taken as an example, in another exemplary embodiment of the present invention, the host system 1000 can also be a digital camera, a video camera, a communication device, an audio player or a video player, etc. For example, when the host system is a digital camera (video camera) 1310, the rewritable non-volatile memory storage apparatus is a secure digital (SD) card 1312, a multimedia card (MMC) card 1314, a memory stick (MS) 1316, a compact flash (CF) card 1318 or an embedded storage device 1320 (shown in FIG. 1C). The embedded storage device 1320 includes an embedded MMC (eMMC). It should be noticed that the eMMC is directly coupled to a substrate of the host system.

Figure 2:
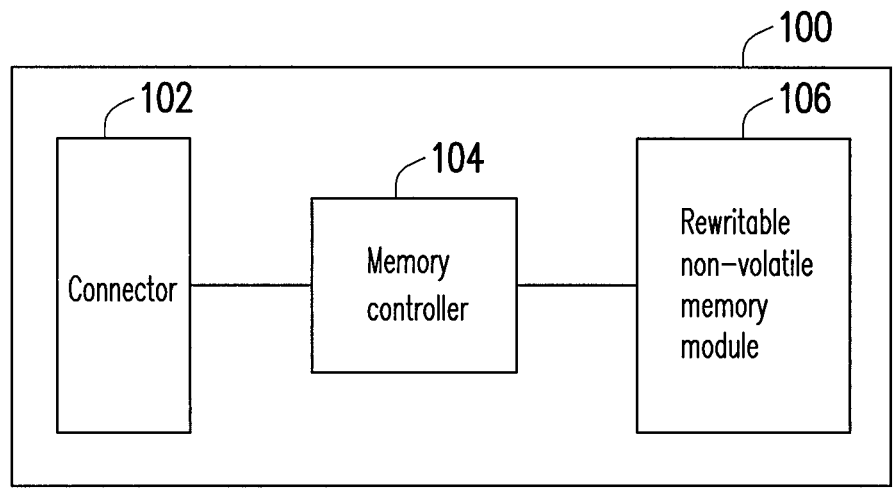
FIG. 2 is a schematic block diagram of a memory storage apparatus of FIG. 1A.

FIG. 2 is a schematic block diagram of a memory storage apparatus of FIG. 1A.

Referring to FIG. 2, the memory storage apparatus 100 includes a connector 102, a memory controller 104 and a rewritable non-volatile memory module 106.

In the present exemplary embodiment, the connector 102 complies with a serial advanced technology attachment (SATA) standard. However, it should be noticed that the present invention is not limited thereto, and the connector 102 may also comply with an institute of electrical and electronic engineers (IEEE) 1394 standard, a peripheral component interconnect express (PCI express) standard, a universal serial buss (USB) standard, a parallel advanced technology attachment (PATA) standard, an SD interface standard, an MS interface standard, a MMC interface standard, a CF interface standard, an integrated drive electronics (IDE) interface standard or other suitable standards.

The memory controller 104 may execute a plurality of logic gates or control instructions implemented by a hardware form or a firmware form, and may perform a program (i.e., write) operation, a read operation or an erase operation on the rewritable non-volatile memory module 106 according to operation commands of the host system 1000.

The rewritable non-volatile memory module 106 is coupled to the memory controller 104 and has a plurality of physical blocks for storing data written by the host system 1000. In the present exemplary embodiment, each physical block has a plurality of physical pages, wherein the physical pages belonging to the same physical block are independently written and are simultaneously erased. For example, each physical block is composed of 128 physical pages, and each physical page has a capacity of 4 kilobyte (KB). However, it should be noticed that the present invention is not limited thereto, and each physical block can be composed of 64 physical pages, 256 physical pages or any other number of the physical pages.

To be specific, physical block is the smallest unit for erasing data. Namely, each physical block contains the least number of memory cells that are erased all together. Physical page is the smallest unit for programming data. Namely, physical page is the smallest unit for writing data. However, in another exemplary embodiment of the invention, the smallest unit for writing data may also be a sector or any other unit. Each physical page usually includes a data bit area and a redundant bit area. The data bit area is used for storing user data, and the redundant bit area is used for storing system data (for example, error checking and correcting (ECC) codes).

In the present exemplary embodiment, the rewritable non-volatile memory module 106 is a multi level cell (MLC) NAND flash memory module. However, the present invention is not limited thereto, and the rewritable non-volatile memory module 106 may also be a single level cell (SLC) NAND flash memory module, other flash memory modules or other memory modules having the same characteristic.

Figure 3:
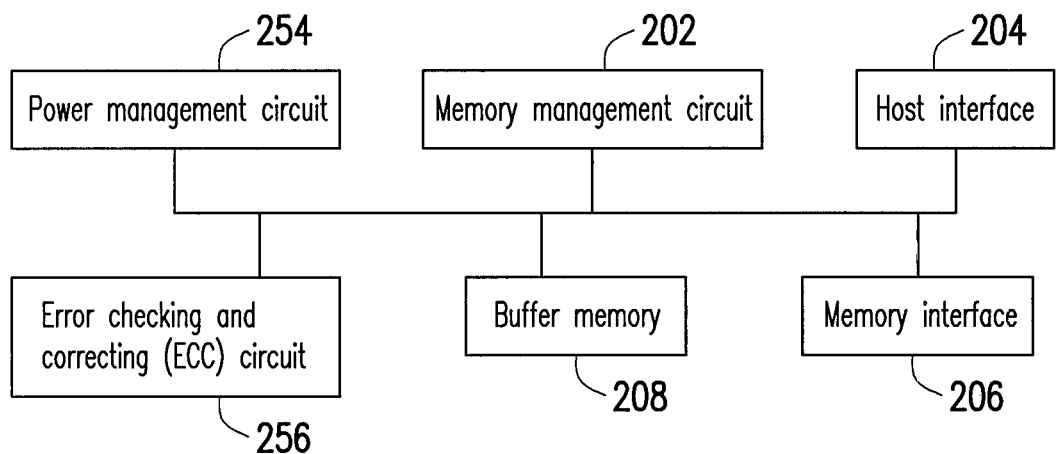
FIG. 3 is a schematic block diagram of a memory controller according to an exemplary embodiment of the present invention.

FIG. 3 is a schematic block diagram of a memory controller according to an exemplary embodiment of the present invention.

Referring to FIG. 3, the memory controller 104 includes a memory management circuit 202, a host interface 204, a memory interface 206 and a buffer memory 208.

The memory management circuit 202 is configured for controlling a whole operation of the memory controller 104. In detail, the memory management circuit 202 has a plurality of control instructions, and when the memory storage apparatus 100 is in operation, these control instructions are executed to perform various operations, such as data write, read and erase operations in the rewritable non-volatile memory module 106 according to the commands from the host system 1000.

In the present exemplary embodiment, the control instructions of the memory management circuit 202 are implemented by a firmware form. For example, the memory management circuit 202 has a micro processing unit (not shown) and a read-only memory (not shown), and these control instructions are burned into the read-only memory. When the memory storage apparatus 100 is in operation, these control instructions are executed by the micro processing unit to carry out various data operations.

In another exemplary embodiment, the control instructions of the memory management circuit 202 can also be stored in a specific area (for example, a system area used for storing system data in the rewritable non-volatile memory module) of the rewritable non-volatile memory module 106 as program codes. Moreover, the memory management circuit 202 has a micro processing unit (not shown), a read-only memory (not shown) and a random access memory (RAM) (not shown). Particularly, the read-only memory has boot codes, and when the memory controller 104 is enabled, the micro processing unit first executes the boot codes to load the control instructions stored in the rewritable non-volatile memory module 106 to the RAM of the memory management circuit 202. Then, the micro processing unit executes these control instructions to perform various data operations. Moreover, in another exemplary embodiment of the present invention, the control instructions of the memory management circuit 202 can also be implemented in a hardware form.

The host interface 204 is coupled to the memory management circuit 202, and is configured for receiving and recognizing commands and data transmitted by the host system 1000. Namely, the commands and data transmitted by the host system 1000 are transmitted to the memory management circuit 202 through the host interface 204. In the present exemplary embodiment, the host interface 204 complies with the SATA standard. However, the present invention is not limited thereto, and the host interface 204 may also comply with the PATA standard, the IEEE 1394 standard, the PCI express standard, the USB standard, the SD standard, the MS standard, the MMC standard, the CF standard, the IDE standard or other suitable data transmission standards.

The memory interface 206 is coupled to the memory management circuit 202 and is configured to access the rewritable non-volatile memory module 106. Namely, data to be written into the rewritable non-volatile memory module 106 is converted into a format that can be accepted by the rewritable non-volatile memory module 106 through the memory interface 206.

The buffer memory 208 is coupled to the memory management circuit 202 and is configured for temporarily storing data and commands from the host system 1000 or data from the rewritable non-volatile memory module 106. Particularly, when a write command and data (hereinafter referred to as "write data") are received from the host system 1000, the memory management circuit 202 temporarily stores the write data and related information (for example, which a logical page to be written with the write data) into the buffer memory 208, and sends a response message to the host system to notify that the write command is completed, so as to shorten a response time. Until the buffer memory 208 is written full, the memory management circuit 202 actually writes the write data into the rewritable non-volatile memory module 106.

It should be noticed that in the present exemplary embodiment, the memory management circuit 202 is designed in a multi-task structure. To be specific, since a time required for receiving command and data from the host system 1000 through the host interface 204 is far less than a time required for transmitting the data to the rewritable non-volatile memory module 106 through the memory interface 206 and waiting for the rewritable non-volatile memory module 106 to program data, by writing data through multiplexing, a write speed of the memory storage apparatus 100 is effectively increased. For example, after a write command of writing data to the rewritable non-volatile memory module 106 is sent, the memory management circuit 202 may continually receive a next command from the host system 1000 without waiting for the rewritable non-volatile memory module 106 to complete the write command.

In an exemplary embodiment of the present invention, the memory controller 104 may further include a power management circuit 254 and an error checking and correcting (ECC) circuit 256. The power management circuit 254 is coupled to the memory management circuit 202 and is configured to control the power of the memory storage apparatus 100.

The ECC circuit 256 is coupled to the memory management circuit 202 and is configured to execute an error checking and correcting procedure to ensure correctness of data. In detail, when the memory management circuit 202 receives a write command from the host system 1000, the ECC circuit 256 generates a corresponding error checking and correcting code (ECC code) for data corresponding to the write command, and the memory management circuit 202 writes the data corresponding to the write command and the corresponding ECC code together to the rewritable non-volatile memory module 106. Then, when the memory management circuit 202 reads data from the rewritable non-volatile memory module 106, it simultaneously reads the ECC code corresponding to the data, and the ECC circuit 256 executes the error checking and correcting procedure on the read data according to the ECC code.

Figure 4:
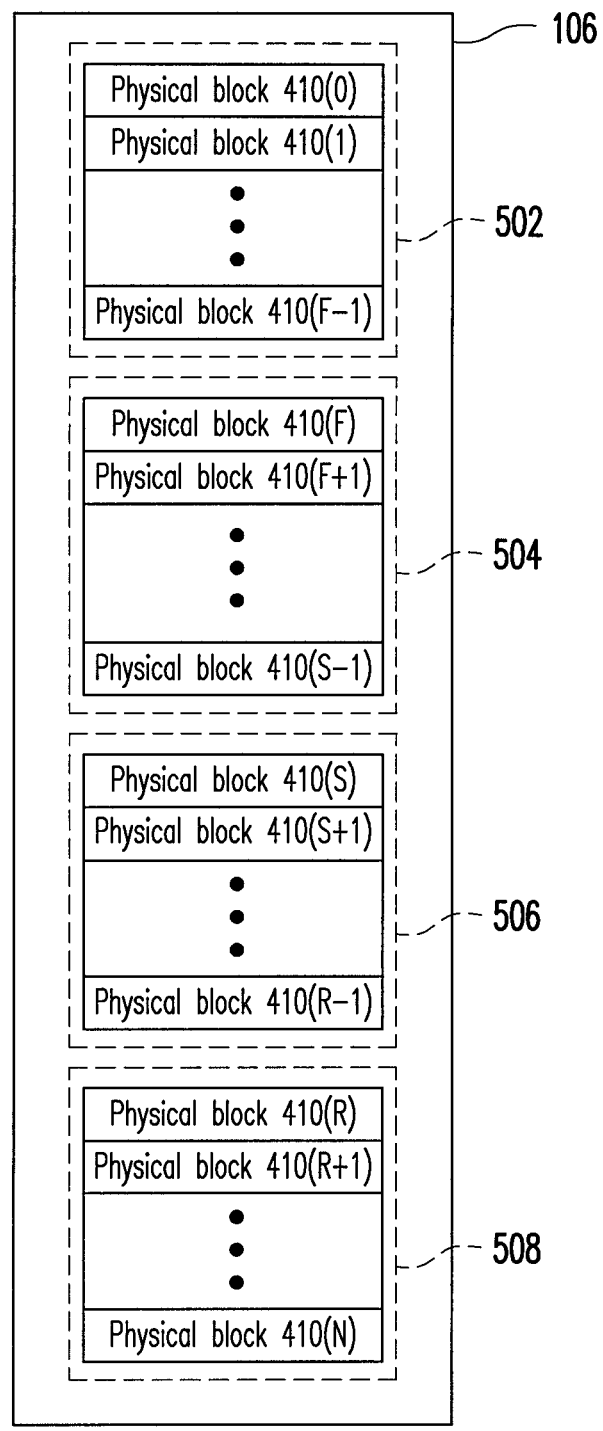
FIG. 4 and FIG. 5 are schematic diagrams illustrating examples of managing physical blocks in a rewritable non-volatile memory module according to an exemplary embodiment of the present invention.
Figure 5:
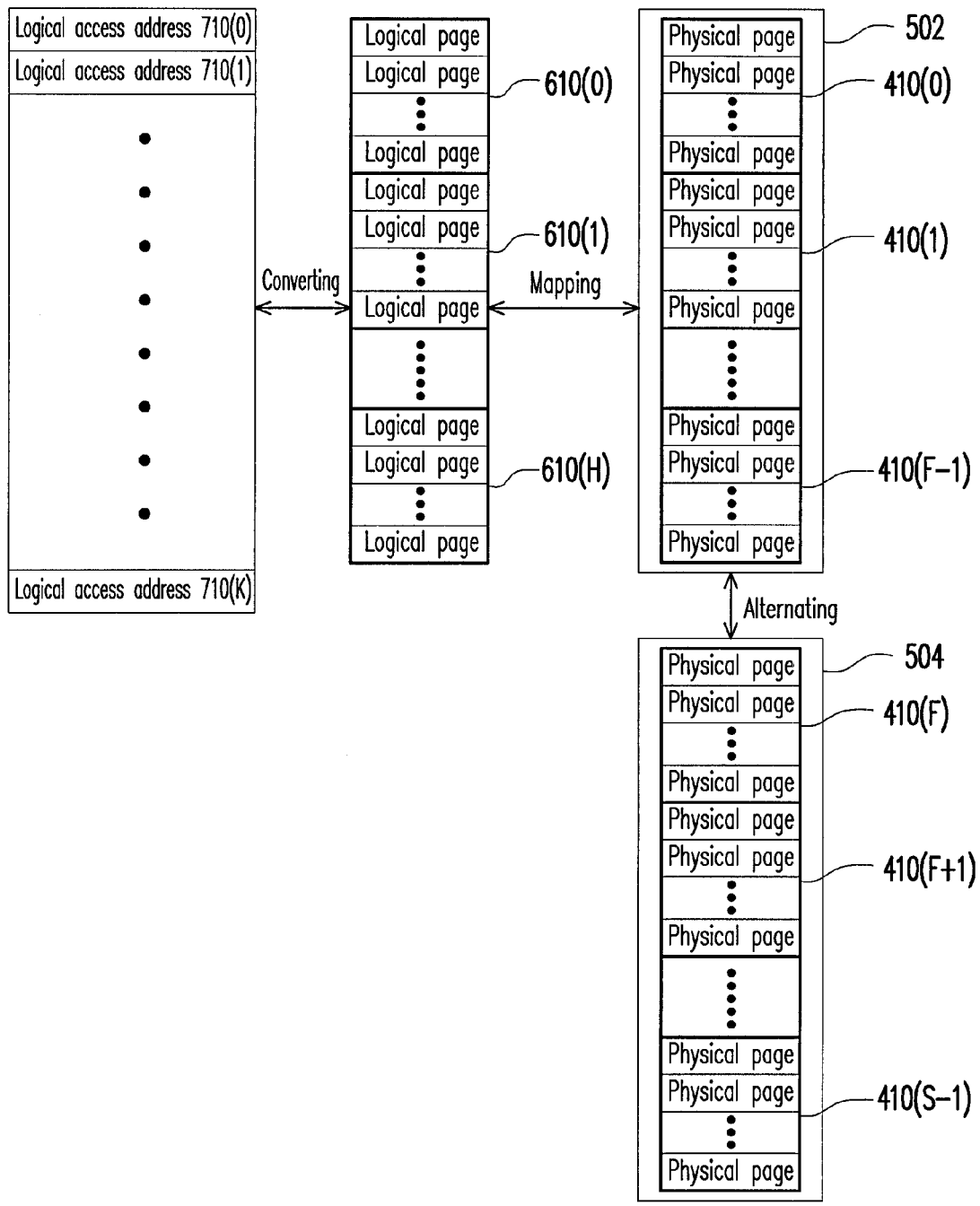

FIG. 4 and FIG. 5 are schematic diagrams illustrating examples of managing physical blocks in the rewritable non-volatile memory module according to an exemplary embodiment of the present invention.

Referring to FIG. 4, the rewritable non-volatile memory module 106 has physical blocks 410(0)-410(N), and the memory management circuit 202 of the memory controller 104 logically groups the physical blocks 410(0)-410(N) into a data area 502, a spare area 504, a system area 506 and a replacement area 508.

The physical blocks logically belonged to the data area 502 and the spare area 504 are used to store data from the host system 1000. In detail, the physical blocks of the data area 502 (which are also referred to as data physical blocks) are regarded as physical blocks already stored with data, and the physical blocks of the spare area 504 (which are also referred to as free physical blocks) are used for writing new data. For example, when the host system 1000 receives a write command and data to be written, the memory management circuit 202 selects a physical block from the spare area 504, and write the data into the physical block. For another example, when a data merging operation is performed to a certain logical block, the memory management circuit 202 selects a physical block from the spare area 504 to serve as a new data physical block corresponding to the logical block for writing data, and substitute the data physical block originally mapped to the logical block.

The physical blocks logically belonged to the system area 506 are used for storing system data. For example, the system data includes manufacturer and a model number of the rewritable non-volatile memory module, the number of the physical blocks of the rewritable non-volatile memory module, and the number of physical pages in each physical block, etc.

The physical blocks logically belonged to the replacement area 508 are used to a bad physical block replacing procedure for replacing bad physical blocks. In detail, when the replacement area 508 still has normal physical blocks and some physical blocks in the data area 502 are damaged, the memory management circuit 202 gets the normal physical blocks from the replacement area 508 to replace the bad physical blocks.

According to the above descriptions, when the memory storage apparatus is in operation, the physical blocks of the data area 502, the spare area 504, the system area 506 and the replacement area 508 are dynamically changed. For example, the physical blocks used for storing data in alternation are variably belonged to the data area 502 or the spare area 504.

It should be noticed that in the present exemplary embodiment, the memory management circuit 202 performs the management in a unit of physical block. However, the present invention is not limited thereto, and in another exemplary embodiment, the memory management circuit 202 may also group the physical blocks into a plurality of physical units, and performs the management in a unit of physical unit. For example, each physical unit is composed of at least one physical block of a same memory sub module or different memory sub modules. Moreover, in another exemplary embodiment of the invention, the physical blocks or physical units can also be divided into a plurality of zones for management.

Referring to FIG. 5, the memory management circuit 202 configures logical blocks 610(0)-610(H) for mapping to the physical blocks of the data area 502, where each logical block has a plurality of logical pages, and the logical pages are sequentially mapped to the physical pages of the corresponding data physical block. For example, when the memory storage apparatus 100 is initialized, the logical blocks 610(0)-610(H) are initially mapped to the physical blocks 410(0)-410(F−1) of the data area 502.

In the present exemplary embodiment, the memory management circuit 202 maintains a logical block-physical block mapping table to record a mapping relationship between the logical blocks 610(0)-610(H) and the physical blocks of the data area 502. Moreover, since the host system 1000 access data in a unit of logical access address (for example, a sector), when the host system 1000 accesses data, the memory management circuit 202 converts the logical access address 710(0)-710(K) corresponding to the memory storage apparatus 100 into corresponding logical pages. For example, when the host system 1000 is about to access a certain logical access address, the memory management circuit 202 converts the logical access address accessed by the host system 1000 into a multidimensional address composed of a corresponding logical block and a corresponding logical page, and accesses data at the mapped physical page according to the logical block-physical block mapping table. For example, when the memory storage apparatus 100 is initialized, the memory management circuit 202 initially maps the physical blocks of the data area 502 to the logical blocks 610(0)-610(H). Particularly, after the initialization, although the physical blocks of the data area 502 are not actually written with data, they are still regarded as physical blocks stored with data.

After the above initialization, the memory storage apparatus 100 can receive write commands and data from the host system 1000.

Figure 6:
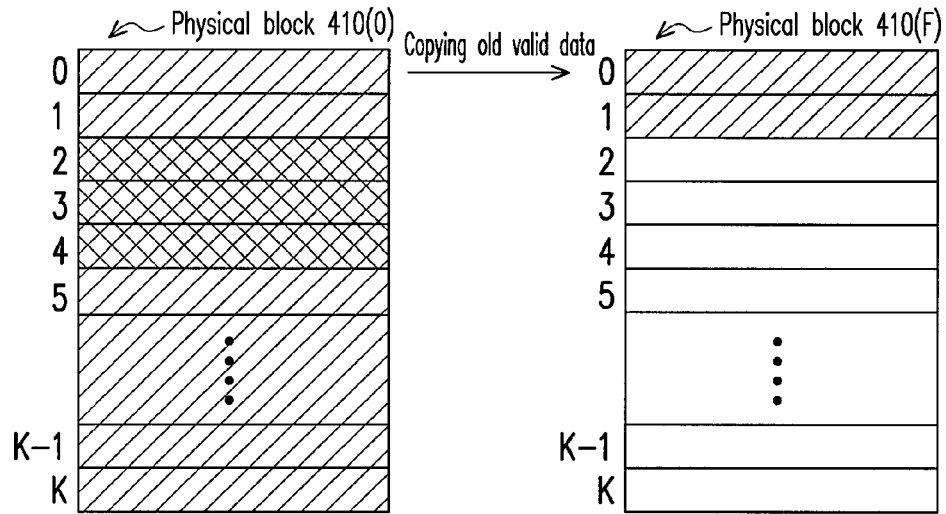
FIG. 6-FIG. 8 are examples of using child physical blocks to write updated data according to an exemplary embodiment of the present invention.
Figure 7:
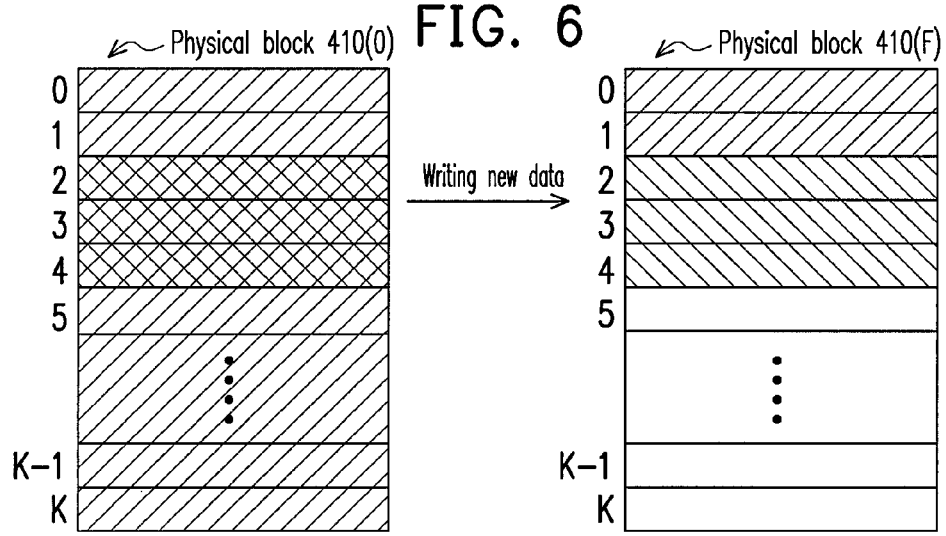
Figure 8:
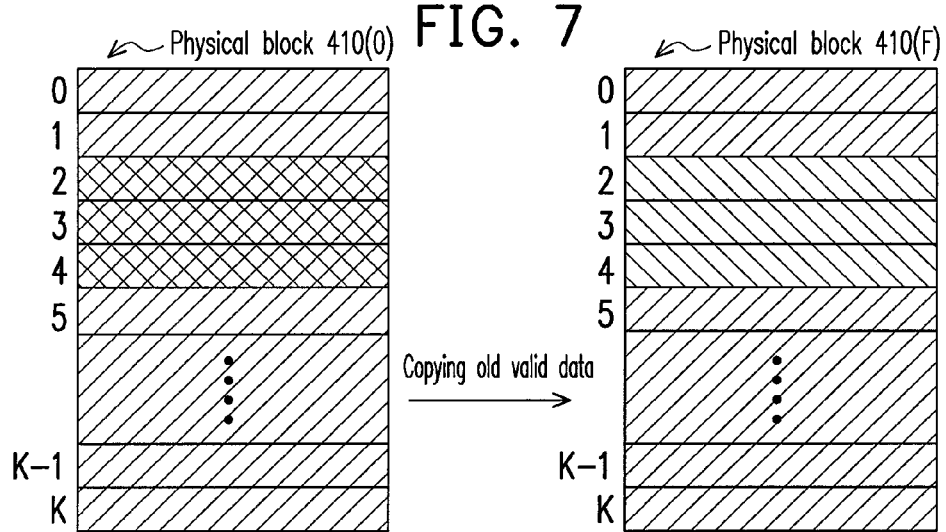

FIG. 6-FIG. 8 are examples of using child physical blocks to write updated data according to an exemplary embodiment of the present invention.

Referring to FIG. 6-FIG. 8, for example, under a mapping state that the logical block 610(0) is mapped to the physical block 410(0), when the memory controller 104 receives a write command from the host system 1000 for writing data to the logical pages belonged to the logical block 610(0), the memory management circuit 202 recognizes that the logical block 610(0) is currently mapped to the physical block 410(0) according to the logical block-physical block mapping table, and selects a physical block 410(F) from the spare area 504 to serve as a substitution physical block to substitute the physical block 410(0). However, while the memory management circuit 202 writes new data into the physical block 410(F), the memory management circuit 202 does not immediately move all valid data in the physical block 410(0) to the physical block 410(F). In detail, the memory management circuit 202 copies the valid data (i.e. data in the $0^{th}$ physical page and the $1^{st}$ physical page of the physical block 410(0)) before the physical page to be written to the $0^{th}$ physical page and the $1^{st}$ physical page of the physical block 410(F) (shown in FIG. 6), and writes the new data into the $2^{nd}$-$4^{th}$ physical pages of the physical block 410(F) (shown in FIG. 7). Now, the memory management circuit 202 completes the write operation. Since the valid data in the physical block 410(0) probably becomes invalid in a next operation (for example, write command), immediate move of the other valid data in the physical block 410(0) to the physical block 410(F) is unnecessary. Moreover, data has to be sequentially written into the physical pages of the physical block, so that the memory management circuit 202 only moves the valid data (i.e. data stored in the $0^{th}$ physical page and the $1^{st}$ physical page of the physical block 410(0)) before the physical page to be written without moving the other valid data (i.e. data stored in the $5^{th}$-$K^{th}$ physical pages in the physical block 410(0)).

In the present exemplary embodiment, an operation for temporarily maintaining such transient relation is referred to as opening of the mother-child blocks, and the original physical block (for example, the physical block 410(0)) is referred to as a mother physical block and the substitution physical block (the physical block 410(F)) is referred to as a child physical block. Herein, one mother physical block and at least one corresponding child physical block are referred to as a mother-child block set.

Figure 9:
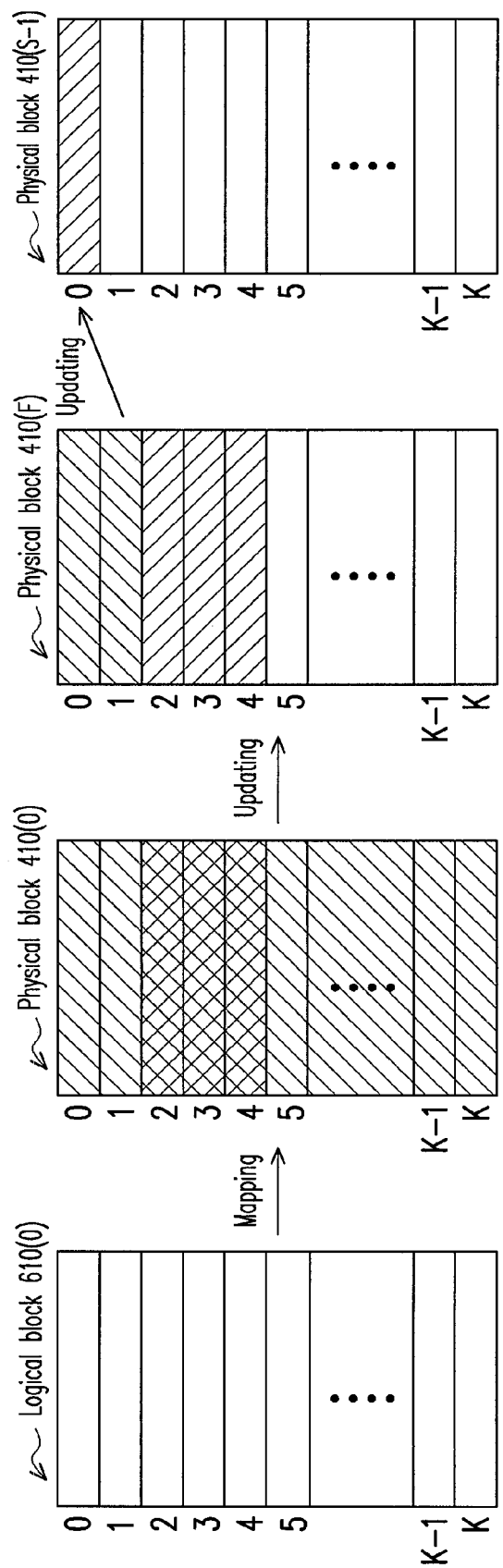
FIG. 9 is a schematic diagram illustrating an example of using a child physical block and a random physical block to write data according to an exemplary embodiment of the present invention.

Then, when the data of the physical block 410(0) and the data of the physical block 410(F) are required to be merged, the memory management circuit 202 merges the data of the physical block 410(0) and the physical block 410(F) to one physical block, so as to improve utilization efficiency of the physical blocks. Herein, the operation of merging the mother and child blocks is referred to as a data merging operation or closing of the mother-child block. For example, as shown in FIG. 9, when the mother-child block set is closed, the memory management circuit 202 copies the remained valid data (i.e. data in the $5^{th}$-$K^{th}$ physical pages in the physical block 410(0)) in the physical block 410(0) to the $5^{th}$ physical page-$K^{th}$ physical page of the substitution physical block 410(F), and erases the physical block 410(0) and associates the erased physical block 410(0) to the spare area 504. Meanwhile, the physical block 410(F) is associated with the data area 502. Namely, the memory management circuit 202 re-maps the logical block 610(0) to the physical block 410(F) in the logical block-physical block mapping table. Moreover, in the present exemplary embodiment, the memory management circuit 202 may establish a spare area physical block table (not shown) to record the physical blocks currently associated to the spare area 504. It should be noticed that the number of the physical blocks in the spare area 504 is limited, so that when the memory storage apparatus 100 is in operation, the number of the opened mother-child block sets is limited. Therefore, when the memory storage apparatus 100 receives the write command from the host system 1000, if the number of the physical blocks in the spare area 504 is smaller than a predetermined number, the memory management circuit 202 first closes at least one of the opened mother-child block sets, and then executes the write command. For example, in the present exemplary embodiment, the predetermined number is set to 2. Though, it should be noticed that the predetermined number may also be other suitable numbers.

Besides using the child physical block to write the updated data, in the present exemplary embodiment, the memory management circuit 202 further selects at least one physical block from the spare area 504 to serve as a random physical block, and uses the random physical block to write the updated data. For example, if data of the logical page to be updated by the host system 1000 has been written into the child physical block, the updated data is written into the random physical block to avoid repeatedly executing the aforementioned data merging operation.

FIG. 9 is a schematic diagram illustrating an example of using a child physical block and a random physical block to write data according to an exemplary embodiment of the invention.

Referring to FIG. 9, it is assumed that a physical block 410(S−1) is selected to serve as the random physical block and under a storage state of FIG. 7, when the host system 1000 wants to write the updated data to the $1^{st}$ logical page of the logical block 610(0), the memory management circuit 202 writes the updated data to a first empty physical page in the random physical block (for example, the $0^{th}$ physical page of the physical block 410(S−1)).

In the exemplary embodiment, when the currently used random physical block is full, the memory management circuit 202 selects another physical block from the spare area 504 to serve as a new random physical block until the number of the physical blocks in the spare area 504 is smaller than the predetermined number. In detail, the number of the physical blocks in the spare area 504 is limited, so that the number of the physical blocks serving as the random physical blocks is limited. When the number of the physical blocks in the spare area 504 is smaller than the predetermined number, the memory management circuit 202 executes the aforementioned data merging operation, and executes the erase operation on the random physical block stored with invalid data, and associates the erased physical block to the spare area 504. In this way, when a next write command is executed, the memory management circuit 202 may select an empty physical block from the spare area 504 to serve as the random physical block.

Figure 10:
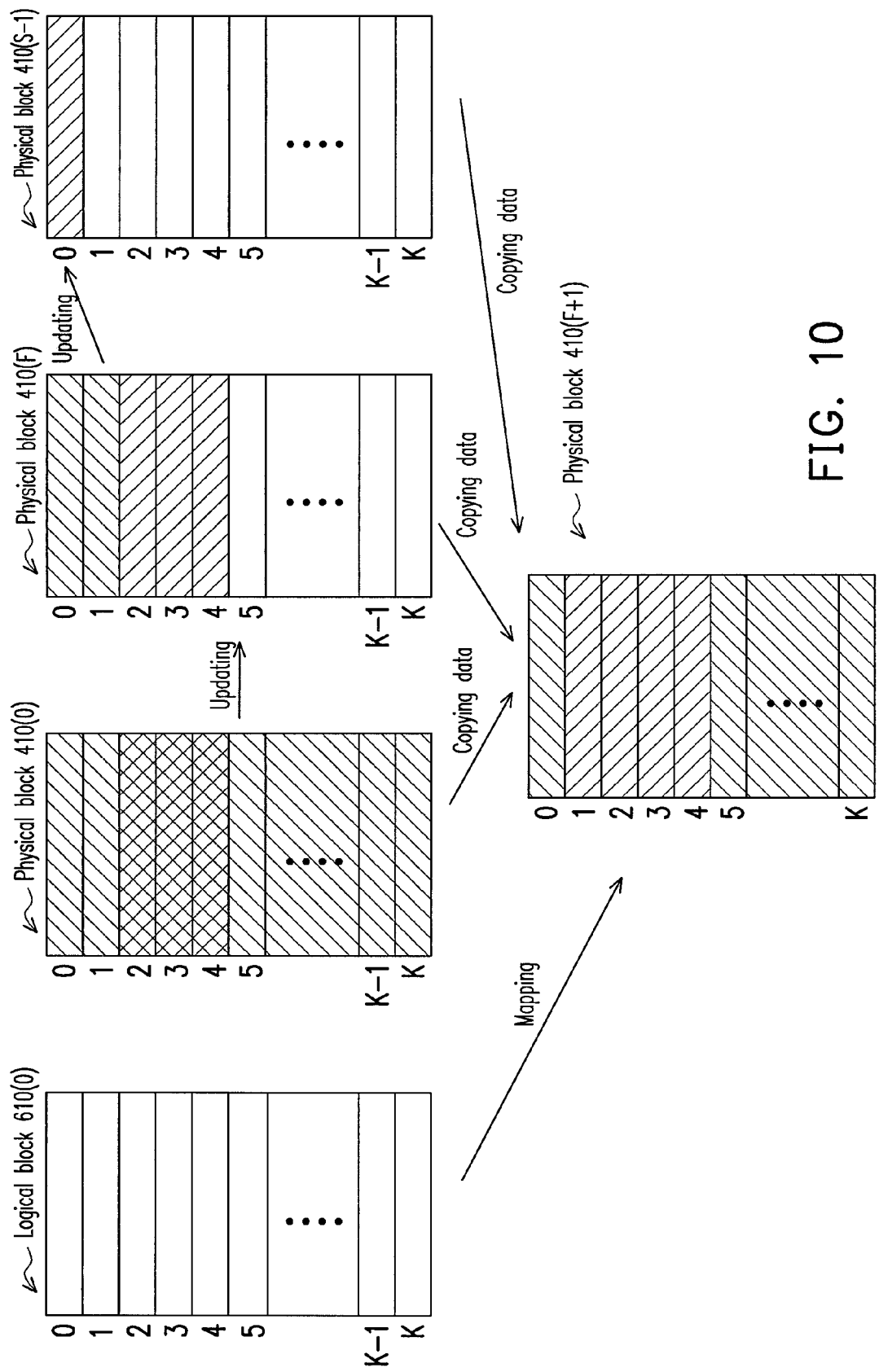
FIG. 10 is an example of executing a data merging operation according to an exemplary embodiment of the invention.

FIG. 10 is an example of executing the data merging operation according to an exemplary embodiment of the invention.

Referring to FIG. 10, when the data merging operation is executed on the logical block 610(0) under the state shown in FIG. 9, the memory management circuit 202 selects an empty physical block 410(F+1) from the spare area 504, and copies the valid data belonged to the logical block 610(0) from the mother physical block 410(0), the child physical block 410(F) and the random physical block 410(S−1) to the physical block 410(F+1), and re-maps the logical block 610(0) to the physical block 410(F+1).

In detail, during the process of copying the valid data, data of the $0^{th}$ physical page of the physical block 410(0) is read and written to the $0^{th}$ physical page of the physical block 410(F+1). Then, data of the $1^{st}$ physical page of the physical block 410(S−1) is read and written to the $1^{st}$ physical page of the physical block 410(F+1). Then, data of the $2^{nd}$-$4^{th}$ physical pages of the physical block 410(F) is sequentially read and sequentially written to the $2^{nd}$-$4^{th}$ physical pages of the physical block 410(F+1). Finally, data of the $5^{th}$-$K^{th}$ physical pages of the physical block 410(0) is sequentially read and sequentially written to the $5^{th}$-$K^{th}$ physical pages of the physical block 410(F+1). Namely, during the data merging operation, the memory management circuit 202 has to repeatedly sending read and write commands to the rewritable non-volatile memory module 106, and the rewritable non-volatile memory module 106 takes a rather long time to complete these read and write commands.

As described above, since the memory management circuit 202 has the multi-task function, after sending the command to the rewritable non-volatile memory module 106, the memory management circuit 202 may still receive commands from the host system 1000. Particularly, in the present exemplary embodiment, when the data merging operation is performed to the rewritable non-volatile memory module 106 and meanwhile a write command and data (hereinafter referred to as "write data") corresponding to the write command are received from the host system 1000, the memory management circuit 202 determines whether a remained capacity (i.e. available storage space) of the buffer memory 208 is smaller than a predetermined capacity and determines whether the number of the physical blocks in the spare area 504 is smaller than the predetermined number. Herein, for example, the predetermined capacity is set to 16 KB, though the present invention is not limited thereto.

If the remained capacity of the buffer memory 208 is smaller than the predetermined capacity and the number of the physical blocks in the spare area 504 is smaller than the predetermined number, after temporarily storing the write data corresponding to the write command to the buffer memory 208, the memory management circuit 202 waits for a dummy delay time and then sends a response message indicating completion of the write command to the host system 100 other than immediately sending the response message to the host system 1000.

In detail, since the time required for executing the data merging operation is relatively long, during a period of executing the data merging operation, the memory management circuit 202 may probably receives a plurality of write commands from the host system 1000. If the buffer memory 208 is full during the process of receiving these write commands, the memory management circuit 202 has to first complete the data merging operation and write a part of data of the buffer memory 208 to the rewritable non-volatile memory module 106, and then continually receives the write commands and the corresponding write data from the host system 1000. Namely, in case that the data merging operation has to be first completed before executing the write command, compared to the previous several write commands, the host system 1000 has to wait a quite long time to receive the response message corresponding to the write command. Therefore, in the present exemplary embodiment, after executing each of the write commands, the memory management circuit 202 waits for a dummy delay time and then sends the response message, so as to level the time for executing each of the write commands.

Figure 11:
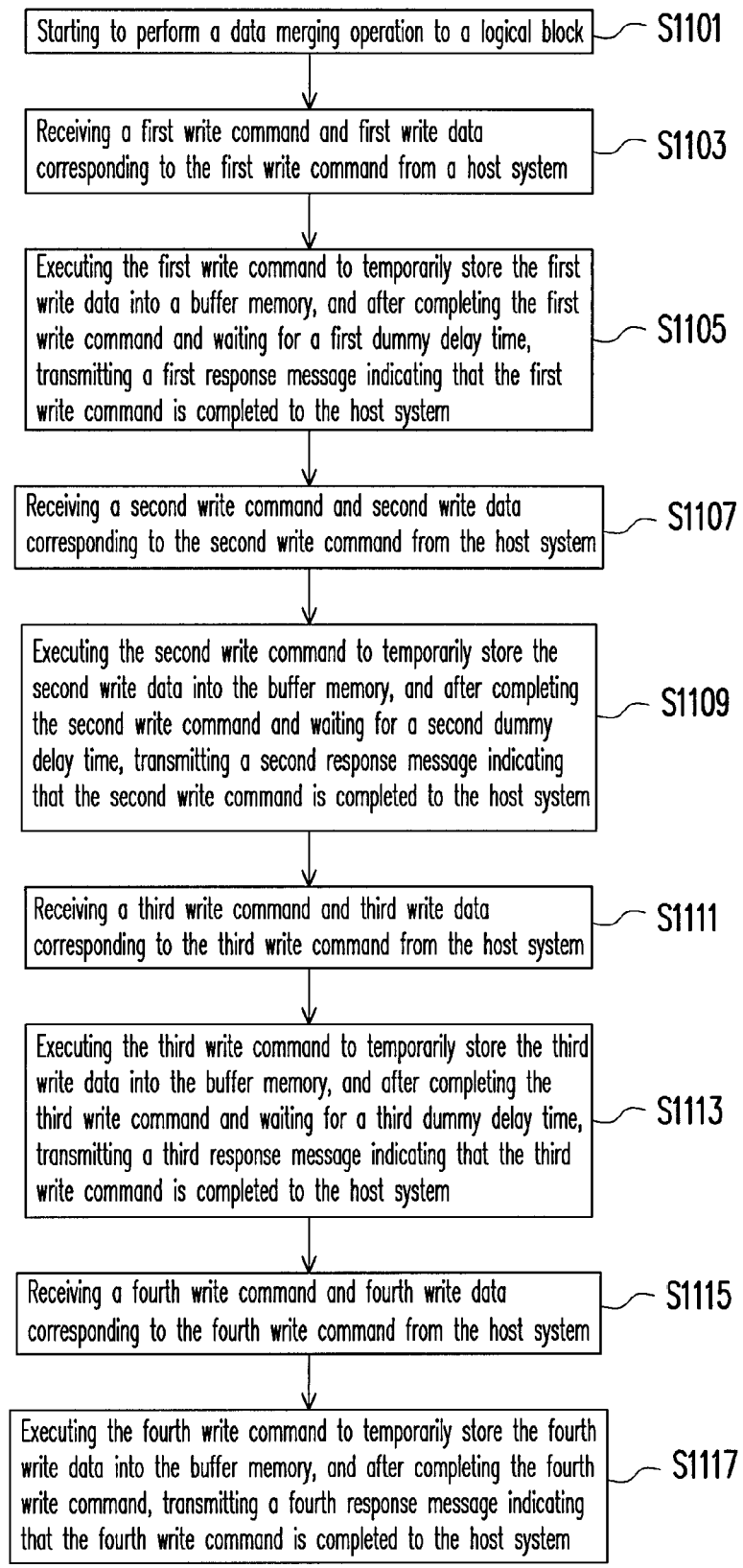
FIG. 11 and FIG. 12 are respectively a flowchart and a timing diagram of executing write commands of a host system according to an exemplary embodiment of the present invention.
Figure 12:
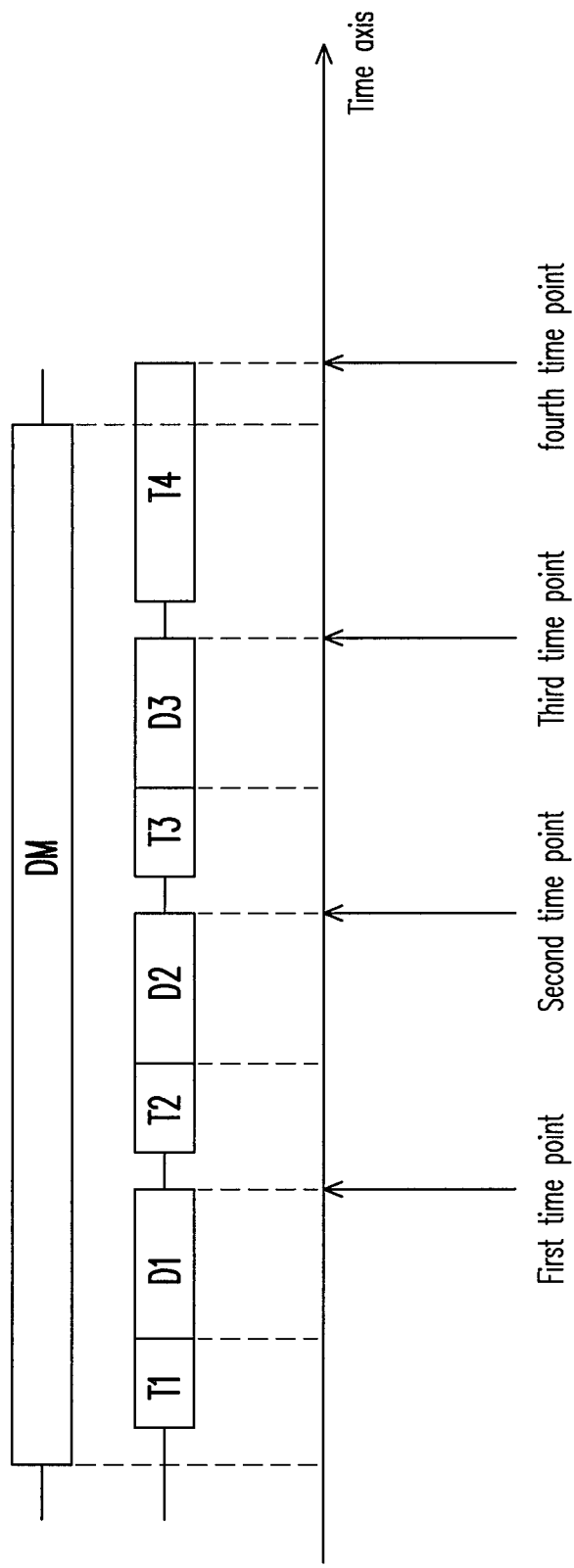

FIG. 11 and FIG. 12 are respectively a flowchart and a timing diagram of executing the write commands of the host system 1000 according to an exemplary embodiment of the present invention, which is an example of executing a plurality of the write commands during the period of executing the data merging operation, where the remained capacity of the buffer memory 208 is smaller than the predetermined capacity, and the number of the physical blocks in the spare area 504 is smaller than the predetermined number.

Referring to FIG. 11 and FIG. 12, in case that the remained capacity of the buffer memory 208 can only store write data of three write commands, in step S1101, the memory management circuit 202 starts to perform a data merging operation DM to a logical block (which is referred to as a first logical block) (i.e., copy valid data of the first logical block to a physical block (which is referred to as a first physical block)).

In step S1103, the memory management circuit 202 receives a write command (which is referred to as a first write command) and write data (which is referred to as first write data) corresponding to the write command from the host system 1000. Then, in step S1105, the memory management circuit 202 spends a period of time T1 to execute the first write command to temporarily store the first write data into the buffer memory 208, and transmits a response message (which is referred to as a first response message) indicating that the first write command is completed to the host system 1000 after completing the first write command and waiting for a dummy delay time D1 (which is referred to as a first dummy delay time). Here, a time point of transmitting the first response message is also referred to as a first time point.

Then, in step S1107, the memory management circuit 202 receives a next write command (which is referred to as a second write command) and write data (which is referred to as second write data) corresponding to the write command from the host system 1000. Then, in step S1109, the memory management circuit 202 spends a period of time T2 to execute the second write command to temporarily store the second write data into the buffer memory 208, and transmits a response message (which is referred to as a second response message) indicating that the second write command is completed to the host system 1000 after completing the second write command and waiting for a dummy delay time D2 (which is referred to as a second dummy delay time). Here, a time point of transmitting the second response message is also referred to as a second time point.

Then, in step S1111, the memory management circuit 202 receives a next write command (which is referred to as a third write command) and write data (which is referred to as third write data) corresponding to the write command from the host system 1000. Then, in step S1113, the memory management circuit 202 spends a period of time T3 to execute the third write command to temporarily store the third write data into the buffer memory 208, and transmits a response message (which is referred to as a third response message) indicating that the third write command is completed to the host system 1000 after completing the third write command and waiting for a dummy delay time D3 (which is referred to as a third dummy delay time). Here, a time point of transmitting the third response message is also referred to as a third time point.

Then, in step S1115, the memory management circuit 202 receives a next write command (which is referred to as a fourth write command) and write data (which is referred to as fourth write data) corresponding to the write command from the host system 1000. Then, in step S1117, the memory management circuit 202 spends a period of time T4 to execute the fourth write command to temporarily store the fourth write data into the buffer memory 208, and transmits a response message (which is referred to as a fourth response message) indicating that the fourth write command is completed to the host system 1000 after completing the fourth write command. Here, a time point of transmitting the fourth response message is also referred to as a fourth time point. Particularly, since the buffer memory 208 is full, the memory management circuit 202 has to first complete the data merging operation DM and write a part of data in the buffer memory 208 into the rewritable non-volatile memory module 106, so as to temporarily store the fourth write data into the buffer memory 208. Therefore, compared to the time T1, the time T2 and the time T3, the time T4 required for completing the fourth write command is relatively long.

In the present exemplary embodiment, the first dummy delay time D1, the second dummy delay time D2 and the third dummy delay time D3 have a same fixed predetermined value, which reduces differences between a time of adding the time T1 by the dummy delay time D1, a time of adding the time T2 by the dummy delay time D2, a time of adding the time T3 by the dummy delay time D3 and the time T4 are. For example, in the exemplary embodiment of FIG. 11, the time required for executing the data merging operation may be approximately estimated and the first dummy delay time D1, the second dummy delay time D2 and the third dummy delay time D3 can be set by dividing the estimated time by 4.

Moreover, in another exemplary embodiment of the present invention, the memory management circuit 202 may also respectively set the first dummy delay time D1, the second dummy delay time D2 and the third dummy delay time D3 according to an execution progress of the corresponding data merging operation.

For example, in the exemplary embodiment of FIG. 11 and FIG. 12, the memory management circuit 202 may set the first dummy delay time D1, the second dummy delay time D2 and the third dummy delay time D3 according to the number of pages of the first physical block that is written with valid data. In detail, when the first write command is completed, the memory management circuit 202 may determine whether the number of the physical pages (i.e. the physical pages written with valid data) in the first physical block that have completed the data merging operation is greater than or equal to a first page number threshold. When the number of the physical pages in the first physical block that have completed the data merging operation is greater than or equal to the first page number threshold, the memory management circuit 202 transmits the first response message to the host system 1000. When the second write command is completed, the memory management circuit 202 may determine whether the number of the physical pages in the first physical block that have completed the data merging operation is greater than or equal to a second page number threshold. When the number of the physical pages in the first physical block that have completed the data merging operation is greater than or equal to the second page number threshold, the memory management circuit 202 transmits the second response message to the host system 1000. Similarly, when the third write command is completed, the memory management circuit 202 may determine whether the number of the physical pages in the first physical block that have completed the data merging operation is greater than or equal to a third page number threshold. When the number of the physical pages in the first physical block that have completed the data merging operation is greater than or equal to the third page number threshold, the memory management circuit 202 transmits the third response message to the host system 1000. For example, in the present exemplary embodiment, one physical block has 128 physical pages, and the first page number threshold, the second page number threshold and the third page number threshold are respectively set to 32, 64 and 96.

Namely, the first dummy delay time D1, the second dummy delay time D2 and the third dummy delay time D3 are dynamically set according to the execution progress of the data merging operation.

Figure 13:
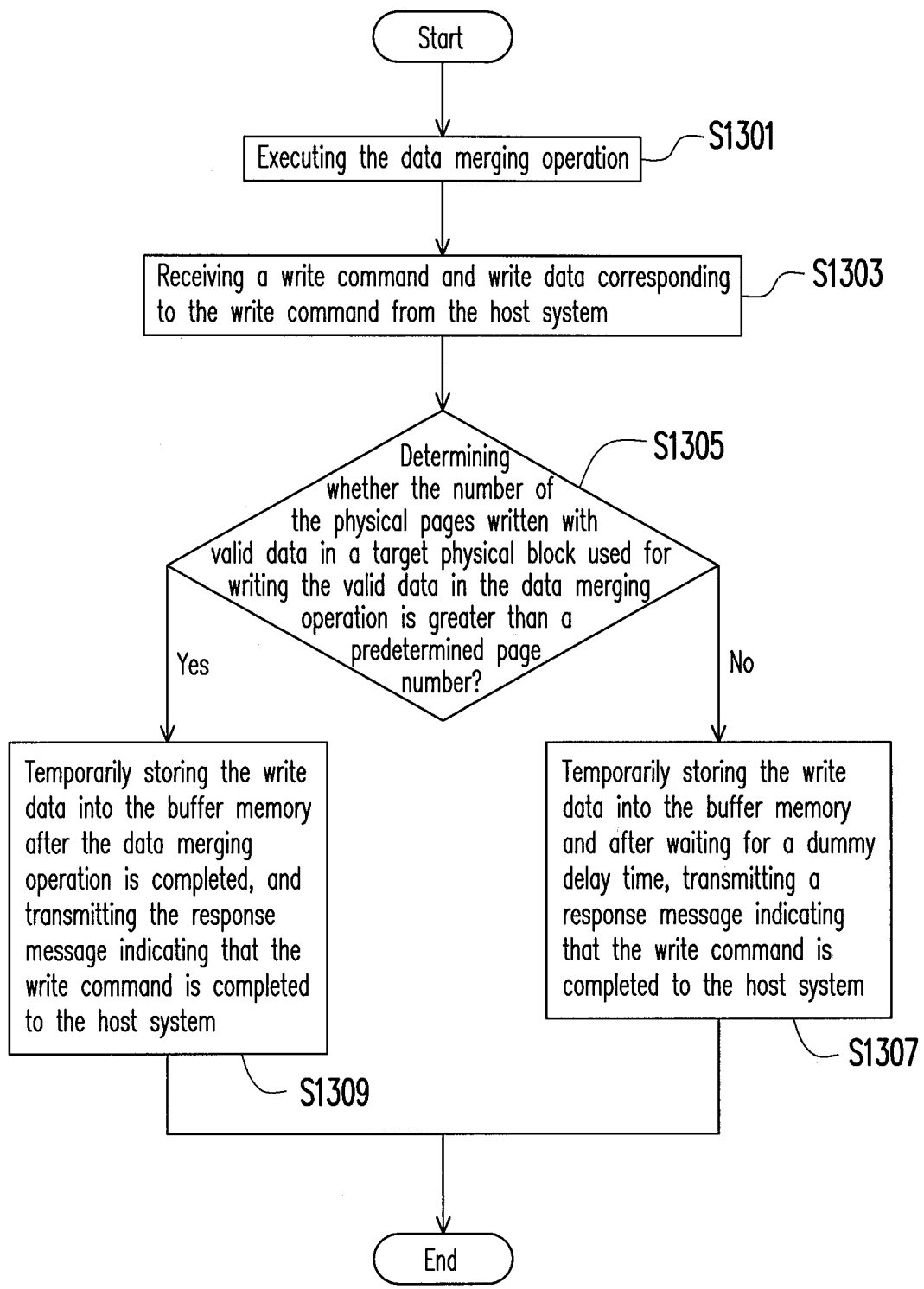
FIG. 13 is a flowchart illustrating a command executing method according to an exemplary embodiment of the present invention.

FIG. 13 is a flowchart illustrating a command executing method according to an exemplary embodiment of the present invention, in which steps of continually executing a plurality of write commands during the period of executing the data merging operation are introduced.

Referring to FIG. 13, during the data merging operation is performed to a certain logical block (i.e. the aforementioned first logical block) (i.e. step S1301), in step S1303, the memory management circuit 202 receives a write command and write data corresponding to the write command from the host system 1000, and in step S1305, the memory management circuit 202 determines whether the number of the physical pages written with valid data in a target physical block (i.e. the aforementioned first physical block) used for writing the valid data in the data merging operation is greater than a predetermined page number. For example, the predetermined page number is set to 75% of the physical page number of a physical block. For example, in the present exemplary embodiment, one physical block has 128 physical pages, and the predetermined page number is set to 96.

When the number of the physical pages written with valid data in the target physical block used for writing the valid data in the data merging operation is not greater than the predetermined page number, in step S1307, the memory management circuit 202 temporarily stores the write data into the buffer memory 208 and then after waiting for a dummy delay time, transmits a response message indicating that the write command is completed to the host system 1000 (i.e. at a delay time point).

When the number of the physical pages written with valid data in the target physical block used for writing the valid data in the data merging operation is greater than the predetermined page number, in step S1309, the memory management circuit 202 temporarily stores the write data into the buffer memory 208 after the data merging operation is completed, and then transmits the response message indicating that the write command is completed to the host system 1000.

It should be noticed that if the buffer memory 208 still has enough remained capacity or the spare area 504 still has enough physical blocks, the memory management circuit 202 may quickly store the write data from the host system 1000 into buffer memory 208 or temporarily write the write data to the random physical block, so as to shorten the time for responding the write command. Therefore, the command executing method of FIG. 13 further includes steps of determining whether the remained capacity of the buffer memory 208 is smaller than the predetermined capacity and whether the number of the physical blocks in the spare area 504 is smaller than the predetermined number (shown in FIG. 14).

Figure 14:
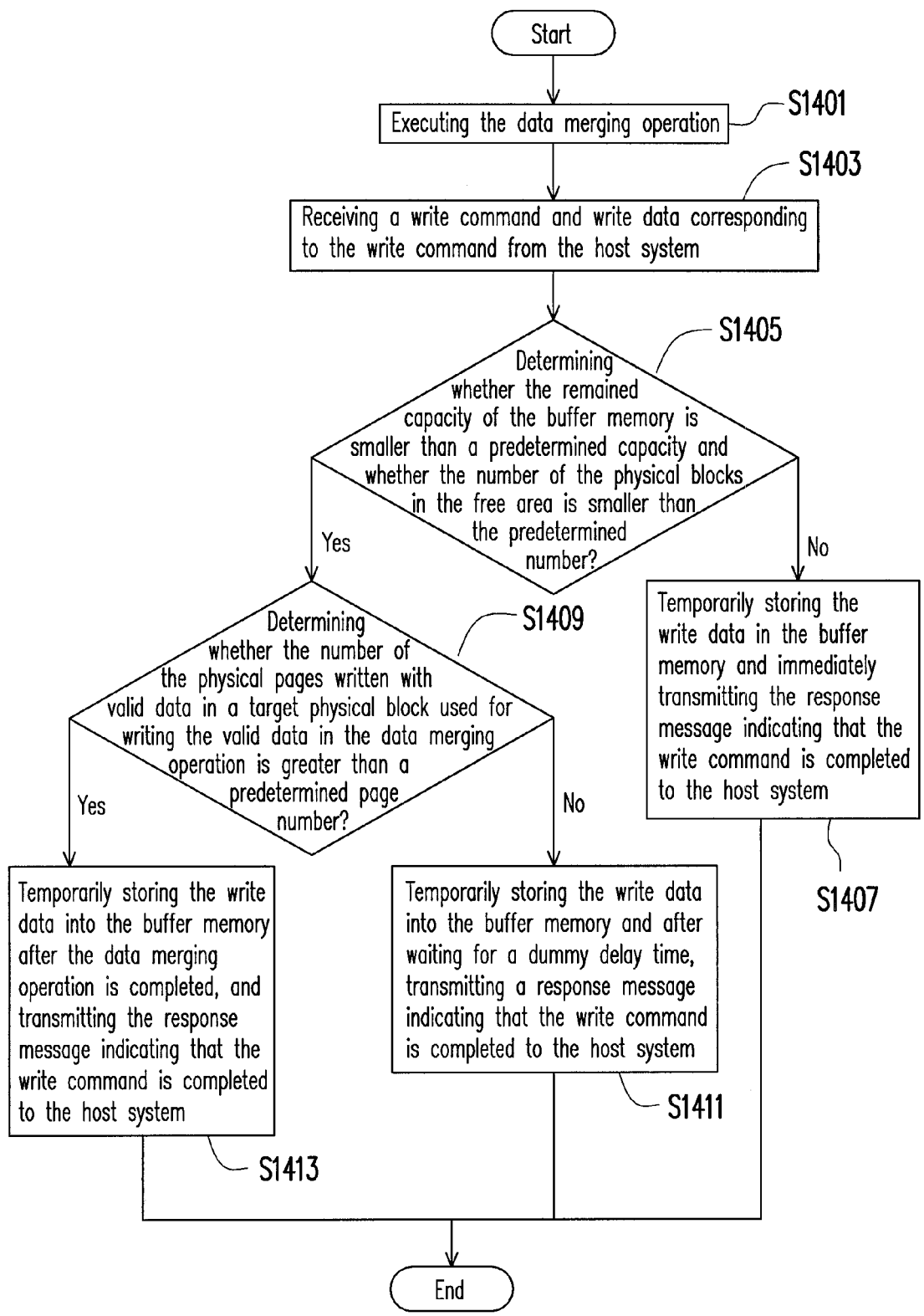
FIG. 14 is a flowchart illustrating a command executing method according to another exemplary embodiment of the present invention.

FIG. 14 is a flowchart illustrating a command executing method according to another exemplary embodiment of the present invention, in which steps of continually executing a plurality of write commands during the period of executing the data, merging operation are introduced.

Referring to FIG. 14, during the data merging operation is performed to a certain logical block (i.e. the aforementioned first logical block) (i.e. step S1401), in step S1403, the memory management circuit 202 receives a write command and write data corresponding to the write command from the host system 1000, and in step S1405, the memory management circuit 202 determines whether the remained capacity of the buffer memory 208 is smaller than the predetermined capacity and whether the number of the physical blocks in the spare area 504 is smaller than the predetermined number.

If the remained capacity of the buffer memory 208 is not smaller than the predetermined capacity or the number of the physical blocks in the spare area 504 is not smaller than the predetermined number, in step S1407, the memory management circuit 202 temporarily stores the write data in the buffer memory 208 and immediately transmits the response message indicating that the write command is completed to the host system 1000.

If the remained capacity of the buffer memory 208 is smaller than the predetermined capacity or the number of the physical blocks in the spare area 504 is smaller than the predetermined number, in step S1409, the memory management circuit 202 determines whether the number of the physical pages written with valid data in the target physical block (i.e. the aforementioned first physical block) used for writing the valid data in the data merging operation is greater than the predetermined page number.

When the number of the physical pages written with valid data in the target physical block used for writing the valid data in the data merging operation is not greater than the predetermined page number, in step S1411, the memory management circuit 202 temporarily stores the write data into the buffer memory 208 and then after waiting for a dummy delay time, transmits a response message indicating that the write command is completed to the host system 1000 (i.e. at a delay time point).

When the number of the physical pages written with valid data in the target physical block used for writing the valid data in the data merging operation is greater than the predetermined page number, in step S1413, the memory management circuit 202 temporarily stores the write data into the buffer memory 208 after the data merging operation is completed, and then transmits the response message indicating that the write command is completed to the host system 1000.

In summary, when the write commands come from the host system are executed during the period of executing the data merging operation, according to the command executing method, the memory controller and the memory storage apparatus of the invention, after the write command is completed and waiting for the dummy delay time, the response message indicating that the write command is completed is transmitted to the host system. Therefore, the response times of the write commands executed during the data merging operation are leveled, and accessing of the memory storage apparatus is smoother. The previously described exemplary embodiments of the present invention have the advantages aforementioned, wherein the advantages aforementioned are not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A command executing method for a memory storage apparatus, wherein the memory storage apparatus has a buffer memory and a rewritable non-volatile memory module, the rewritable non-volatile memory module has a plurality of physical blocks, and the physical blocks are logically grouped into at least a data area and a spare area, and the physical blocks of the data area are mapped to a plurality of logical blocks, the command executing method comprising:

executing a data merging operation to a first logical block in the logical blocks, wherein during the data merging operation, valid data belonging to the first logical block is copied to a first physical block selected from the spare area, and the first physical block has a plurality of physical pages;

receiving a write command and a write data corresponding to the write command from a host system during a period of executing the data merging operation;

determining whether the number of the physical pages written with data in the first physical block is greater than a predetermined physical page number; and when the number of the physical pages written with data in the first physical block is not greater than the predetermined physical page number, temporarily storing the write data into the buffer memory and then transmitting a response message to the host system at a delay time point, wherein the delay time point is set by adding a dummy delay time to a time point that the operation of writing the write data into the buffer memory is completed, and the response message is used for notifying that the write command is completed.

2. The command executing method as claimed in claim 1, further comprising:

when the number of the physical pages written with data in the first physical block is greater than the predetermined physical page number, transmitting the response message to the host system at the time point that the operation of writing the write data into the buffer memory is completed.

3. The command executing method as claimed in claim 1, further comprising:
determining whether a remained capacity of the buffer memory is smaller than a predetermined capacity and whether the number of the physical blocks belonged to the spare area is smaller than a predetermined number,
wherein the step of determining whether the number of the physical pages written with data in the first physical block is greater than the predetermined physical page number is executed when the remained capacity of the buffer memory is smaller than the predetermined capacity and the number of the physical blocks belonged to the spare area is smaller than the predetermined number.

4. The command executing method as claimed in claim 1, further comprising:
when the remained capacity of the buffer memory is not smaller than the predetermined capacity or the number of the physical blocks belonged to the spare area is not smaller than the predetermined number, transmitting the response message to the host system at the time point that the operation of writing the write data into the buffer memory is completed.

5. The command executing method as claimed in claim 1, further comprising:
setting the dummy delay time to a fixed predetermined value.

6. The command executing method as claimed in claim 1, further comprising:
dynamically setting the dummy delay time according to an execution progress corresponding to the data merging operation.

7. A memory controller for controlling a rewritable non-volatile memory module, the memory controller comprising:
a host interface, configured to couple to a host system;
a memory interface, configured to couple to the rewritable non-volatile memory module, wherein the rewritable non-volatile memory module has a plurality of physical blocks;
a memory management circuit, coupled to the host interface and the memory interface; and
a buffer memory, coupled to the memory management circuit,
wherein the memory management circuit is configured to logically group the physical blocks into at least a data area and a spare area and configure a plurality of logical blocks for mapping to the physical blocks of the data area,
wherein the memory management circuit performs a data merging operation to a first logical block in the logical blocks, and during the data merging operation, valid data belonging to the first logical block is copied to a first physical block selected from the spare area, wherein the first physical block has a plurality of physical pages,
wherein the memory management circuit receives a write command and a write data corresponding to the write command from the host system during a period of executing the data merging operation,
wherein the memory management circuit determines whether the number of the physical pages written with data in the first physical block is greater than a predetermined physical page number,
wherein when the number of the physical pages written with data in the first physical block is not greater than the predetermined physical page number, the memory management circuit temporarily stores the write data into the buffer memory and then transmits a response message to the host system at a delay time point, wherein the delay time point is set by adding a dummy delay time to a time point that the operation of writing the write data into the buffer memory is completed, and the response message is used for notifying that the write command is completed.

8. The memory controller as claimed in claim 7,
wherein when the number of the physical pages written with data in the first physical block is greater than the predetermined physical page number, the memory management circuit transmits the response message to the host system at the time point that the operation of writing the write data into the buffer memory is completed.

9. The memory controller as claimed in claim 7,
wherein the memory management circuit determines whether a remained capacity of the buffer memory is smaller than a predetermined capacity and whether the number of the physical blocks belonged to the spare area is smaller than a predetermined number,
wherein only when the remained capacity of the buffer memory is smaller than the predetermined capacity and the number of the physical blocks belonged to the spare area is smaller than the predetermined number, the memory management circuit determines whether the number of the physical pages written with data in the first physical block is greater than the predetermined physical page number.

10. The memory controller as claimed in claim 9,
wherein when the remained capacity of the buffer memory is not smaller than the predetermined capacity or the number of the physical blocks belonged to the spare area is not smaller than the predetermined number, the memory management circuit transmits the response message to the host system at the time point that the operation of writing the write data into the buffer memory is completed.

11. The memory controller as claimed in claim 7, wherein the dummy delay time is a fixed predetermined value.

12. The memory controller as claimed in claim 7, wherein the memory management circuit dynamically sets the dummy delay time according to an execution progress corresponding to the data merging operation.

13. A memory storage apparatus, comprising:
a connector, configured to couple to a host system;
a rewritable non-volatile memory module, having a plurality of physical blocks; and
a memory controller, coupled to the rewritable non-volatile memory module and the connector,
wherein the memory controller is configured to logically group the physical blocks into at least a data area and a spare area and configure a plurality of logical blocks for mapping to the physical blocks of the data area,
wherein the memory controller performs a data merging operation to a first logical block in the logical blocks, and during the data merging operation, valid data belonging to the first logical block is copied to a first physical block selected from the spare area, wherein the first physical block has a plurality of physical pages,
wherein the memory controller receives a write command and a write data corresponding to the write command from the host system during a period of executing the data merging operation, wherein the memory controller determines whether the number of the physical pages written with data in the first physical block is greater than a predetermined physical page number, wherein when the number of the physical pages written with data in the first physical block is not greater than the predetermined physical page number, the memory controller temporarily stores the write data into the buffer memory and then transmits a response message to the host system at a delay time point, wherein the delay time point is set by adding a dummy delay time to a time point that the operation of writing the write data into the buffer memory is completed, and the response message is used for notifying that the write command is completed.

14. The memory storage apparatus as claimed in claim 13, wherein when the number of the physical pages written with data in the first physical block is greater than the predetermined physical page number, the memory controller transmits the response message to the host system at the time point that the operation of writing the write data into the buffer memory is completed.

15. The memory storage apparatus as claimed in claim 13, wherein the memory controller determines whether a remained capacity of the buffer memory is smaller than a predetermined capacity and whether the number of the physical blocks belonged to the spare area is smaller than a predetermined number, wherein only when the remained capacity of the buffer memory is smaller than the predetermined capacity and the number of the physical blocks belonged to the spare area is smaller than the predetermined number, the memory controller determines whether the number of the physical pages written with data in the first physical block is greater than the predetermined physical page number.

16. The memory storage apparatus as claimed in claim 15, wherein when the remained capacity of the buffer memory is not smaller than the predetermined capacity or the number of the physical blocks belonged to the spare area is not smaller than the predetermined number, the memory controller transmits the response message to the host system at the time point that the operation of writing the write data into the buffer memory is completed.

17. The memory storage apparatus as claimed in claim 13, wherein the dummy delay time is a fixed predetermined value.

18. The memory storage apparatus as claimed in claim 13, wherein the memory controller dynamically sets the dummy delay time according to an execution progress corresponding to the data merging operation.

19. A command executing method for a memory storage apparatus, wherein the memory storage apparatus has a buffer memory and a rewritable non-volatile memory module, the rewritable non-volatile memory module has a plurality of physical blocks, the physical blocks are logically grouped into at least a data area and a spare area, and the physical blocks of the data area are mapped to a plurality of logical blocks, the command executing method comprising:

executing a data merging operation to a first logical block in the logical blocks, wherein during the data merging operation, valid data belonging to the first logical block is copied to a first physical block selected from the physical blocks of the spare area;

receiving a first write command and a first write data corresponding to the first write command from a host system and temporarily storing the first write data into the buffer memory during a period of executing the data merging operation; and transmitting a first response message to the host system at a first time point, wherein the first time point is set by adding a first dummy delay time to a time point that the operation of writing the first write data into the buffer memory is completed, and the first response message is used for notifying that the first write command is completed.

20. The command executing method as claimed in claim 19, further comprising:

receiving a second write command and a second write data corresponding to the second write command from the host system and temporarily storing the second write data into the buffer memory during the period of executing the data merging operation;

transmitting a second response message to the host system at a second time point, wherein the second time point is set by adding a second dummy delay time to a time point that the operation of writing the second write data into the buffer memory is completed, and the second response message is used for notifying that the second write command is completed;

receiving a third write command and a third write data corresponding to the third write command from the host system and temporarily storing the third write data into the buffer memory during the period of executing the data merging operation; and transmitting a third response message to the host system at a third time point, wherein the third time point is set by adding a third dummy delay time to a time point that the operation of writing the third write data into the buffer memory is completed, and the third response message is used for notifying that the third write command is completed.

21. The command executing method as claimed in claim 19, further comprising:

receiving a fourth write command and a fourth write data corresponding to the fourth write command from the host system and temporarily storing the fourth write data into the buffer memory during the period of executing the data merging operation; and transmitting a fourth response message to the host system at a fourth time point, wherein the fourth time point is a time point that the operation of writing the fourth write data into the buffer memory and the data merging operation are completed, and the fourth response message is used for notifying that the fourth write command is completed.

22. The command executing method as claimed in claim 20, further comprising:

respectively setting the first dummy delay time, the second dummy delay time and the third dummy delay time to a fixed predetermined value.

23. The command executing method as claimed in claim 20, further comprising:

respectively setting the first dummy delay time, the second dummy delay time and the third dummy delay time according to an execution progress of the data merging operation, wherein the first physical block has a plurality of physical pages, wherein at the first time point, the number of the physical pages written with data in the first physical block is greater than or equal to a first page number threshold, wherein at the second time point, the number of the physical pages written with data in the first physical block is greater than or equal to a second page number threshold, wherein at the third time point, the number of the physical pages written with data in the first physical block is greater than or equal to a third page number threshold.

24. A memory controller for controlling a rewritable non-volatile memory module, the memory controller comprising:

a host interface, configured to couple to a host system;

a memory interface, configured to couple to the rewritable non-volatile memory module, wherein the rewritable non-volatile memory module has a plurality of physical blocks;

a memory management circuit, coupled to the host interface and the memory interface; and a buffer memory, coupled to the memory management circuit, wherein the memory management circuit is configured to logically group the physical blocks into at least a data area and a spare area and configure a plurality of logical blocks for mapping to the physical blocks of the data area, wherein the memory management circuit performs a data merging operation to a first logical block in the logical blocks, and during the data merging operation, valid data belonging to the first logical block is copied to a first physical block selected from the spare area, wherein the memory management circuit receives a first write command and a first write data corresponding to the first write command from the host system and temporarily stores the first write data into the buffer memory during a period of executing the data merging operation, wherein the memory management circuit transmits a first response message to the host system at a first time point, wherein the first time point is set by adding a first dummy delay time to a time point that the operation of writing the first write data into the buffer memory is completed, and the first response message is used for notifying that the first write command is completed.

25. A memory storage apparatus, comprising:

a connector, configured to couple to a host system;

a rewritable non-volatile memory module, having a plurality of physical blocks; and a memory controller, coupled to the rewritable non-volatile memory module and the connector, wherein the memory controller is configured to logically group the physical blocks into at least a data area and a spare area and configure a plurality of logical blocks for mapping to the physical blocks of the data area, wherein the memory controller performs a data merging operation to a first logical block in the logical blocks, and during the data merging operation, valid data belonged to the first logical block is copied to a first physical block selected from the spare area, wherein the memory controller receives a first write command and a first write data corresponding to the first write command from the host system and temporarily stores the first write data into the buffer memory during a period of executing the data merging operation, wherein the memory controller transmits a first response message to the host system at a first time point, wherein the first time point is set by adding a first dummy delay time to a time point that the operation of writing the first write data into the buffer memory is completed, and the first response message is used for notifying that the first write command is completed.

* * * * *